Oct. 1, 1929.     E. F. BACON     1,730,109
LEVEL
Filed Aug. 28, 1924
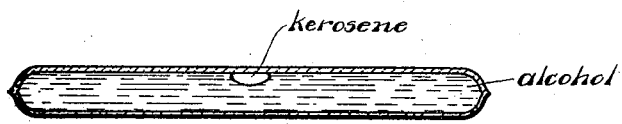
INVENTOR
E. F. Bacon
BY
Robert H. Young
ATTORNEY Patented Oct. 1, 1929

1,730,109

UNITED STATES PATENT OFFICE

ELBRIDGE F. BACON, OF DAYTON, OHIO

LEVEL

Application filed August 28, 1924. Serial No. 734,774.

This invention relates to improvements in levels and more particularly a level for use with aeronautical instruments.

In aeronautical instruments using levels as standards, considerable difficulty and inaccuracy in making observations or calculations arose, due to the constant movement of the bubble as a result of inertia effects of the mobile substance of the standard.

It is the principal object of the present invention to provide a level using two liquids having slightly different specific gravities, so as to have substantially the same inertia effects in the accelerations of the aircraft, the one liquid being present as a globule simulating a bubble and being immiscible in the other liquid.

The accompanying drawing is a longitudinal section of a level incorporating the improvements of the invention.

The level illustrated is of the type commonly used in aeronautical instruments such as sextants and the like, and may be convexed or concaved as desired. In accordance with the present invention the level is filled preferably with alcohol, in which a globule of kerosene floats substantially in the form of a bubble to simulate the ordinary air bubble commonly used in spirit levels. If desired the alcohol may be tinted to set off the kerosene globule and thus facilitate readings. These liquids are selected because they have slightly different specific gravities, are immiscible one in the other, and freeze at rather low temperatures. Also, in case the kerosene globule is broken due to violent shaking of the level, the globule readily reunites in the same manner as a mercury globule. Having slightly different specific gravities, the liquids have substantially the same inertia effects in the accelerations of an aircraft in flight. As a result the accelerations of the aircraft will have no appreciable effect on the stabilty of the bubble globule and readings are greatly facilitated and have been found to be far more accurate than where the instrument is provided with an ordinary spirit level having an air bubble. The accelerations are the result of momentary pitching or diving of the plane despite the aviator's concentrated efforts toward keeping the plane on an even keel at the time an observation is being made. This is due to the air pockets and currents encountered in flight. A sudden and momentary nosing down of the plane for example, results in a sudden acceleration and occurs with an angular acceleration of the airplane. This angular acceleration incidently produces a lineal acceleration. Hence with the motor and propeller turning at a constant speed the speed of the airplane increases as it noses down from level flight. A deflection of 1° in the position of the airplane causes an indication of a far greater deflection in the level, due to the accelerations on the mass of the liquid or other mobile matter in the level. In the case of an ordinary spirit level which has an air bubble, an acceleration results in the liquid in the tube crowding to the back of the tube due to inertia so that the bubble is caused to move forward. It is obvious that where the bubble is replaced by a globule of liquid having substantially the same inertia effect as the liquid in the level, the bubble globule remains stable in the presence of slight accelerations. These accelerations are practically constantly occurring, even though they may be so slight as not to be sensible to the aviator.

The kerosene globule in alcohol stated above as a preferred embodiment of the invention is not to be considered as a limiting form, since I have found that substantially the same results can be obtained for the same class of work where a kerosene globule is floated in a 25% calcium chloride ($CaCl_2$) solution. These liquids similarly to kerosene and alcohol are immiscible one in the other and freeze at a low temperature. Likewise the kerosene globule will readily reunite if broken and mechanically mixed in the calcium chloride solution.

I have also found that very good results are obtainable with a drop of heavy oil in alcohol and water. The water added to the alcohol will cause the oil globule to float whereas pure alcohol permits the globule to roll on the bottom of the tube. It may be stated at this point that so far as the spirit of the present invention is concerned, the globule may be of the liquid of a greater specific gravity so as to stay on the bottom of the tube, although it is obvious that it is preferable in most cases to have the globule of lower specific gravity in order to float in the liquid in the tube. In the above instance the oil globule is best set off from the liquid by the addition of coloring matter either to the globule or to the liquid, it being obviously necessary to select a coloring matter for the one liquid which is insoluble in the other liquid. As other obvious adaptations of the invention, there may be mentioned the use of mercury with a dampening or cushioning liquid, or a ball of aluminum or other light metal in a heavy liquid such as mercury.

It will be understood that the invention is not limited by the specific form illustrated nor by the forms otherwise described, and although the invention has been described as applied to a level for use with aeronautical instruments, the features of the invention may be found advantageous for use generally with levels used for different purposes. All possible adaptations and modifications of the invention are contemplated which come within the spirit and scope of the appendant claims.

I claim:

1. A level vial containing a kerosene bubble globule insolvent with and floating in another liquid of slightly greater specific gravity from that of kerosene.

2. A level vial containing a kerosene bubble globule floating in another liquid of only slightly greater specific gravity than kerosene the latter being immiscible with kerosene and having a low freezing point as low as the freezing point of kerosene, one of said liquids being colored.

3. A spirit level vial containing commercial alcohol and substantially filling said level vial, a globule of kerosene immiscible therewith and floating therein, the kerosene having a slightly less specific gravity than that of said alcohol.

4. A spirit level vial containing two low freezing liquids, one of said liquids substantially filling said level vial, and the other of said liquids filling the void left by said first named liquid in the form of a globule simulating a bubble, said last named liquid having a specific gravity slightly less than said first named liquid.

5. A level vial for aeronautical instruments containing two mutually insoluble mobile liquids, one of said liquids having a specific gravity of approximately .81, the other liquid having a specific gravity slightly greater than that of the first named liquid.

In testimony whereof I affix my signature.

ELBRIDGE F. BACON.